United States Patent [19]
Isozumi

[11] Patent Number: 4,954,733
[45] Date of Patent: Sep. 4, 1990

[54] COAXIAL STARTER

[75] Inventor: Shuzoo Isozumi, Hyogo, Japan

[73] Assignee: Mitsubishi Denki Kabushiki Kaisha, Tokyo, Japan

[21] Appl. No.: 324,506

[22] Filed: Mar. 16, 1989

[30] Foreign Application Priority Data

Mar. 17, 1988 [JP] Japan .................................. 63-66019

[51] Int. Cl.[5] ........................ H02K 11/00; H02K 7/10; F02N 11/00

[52] U.S. Cl. ........................................ 310/71; 310/83; 290/48; 74/7 A

[58] Field of Search ........................ 310/92, 71, 83, 80; 290/38 R, 38 A, 48; 74/6, 7 R, 7 A, 7 B, 7 C, 7 E; 325/131

[56] References Cited

U.S. PATENT DOCUMENTS 4,525,632 6/1985 Tanaka .............................. 290/38 R
4,816,712 3/1989 Tanaka .................................... 310/80

FOREIGN PATENT DOCUMENTS 1311876 11/1962 France .

*Primary Examiner*—Peter S. Wong
*Assistant Examiner*—C. La Balle
*Attorney, Agent, or Firm*—Sughrue, Mion, Zinn, Macpeak & Seas

[57] ABSTRACT

A coaxial starter for starting an engine comprises an electric motor having an armature shaft which is hollow; an output rotary shaft which is disposed at the front end of the motor and inserted in the internal opening of the armature shaft at one end of the output rotary shaft so as to be slidable in the axial direction of the output rotary shaft, and has a pinion at the other end thereof so that the pinion is engaged with or disengaged from the ring gear of an engine; an overrunning clutch for transmitting the rotatory power of the armature shaft to the output rotary shaft; and an electromagnetic switch disposed at the rear end of the motor so as to energize the motor and slide the output rotary shaft, wherein a housing nearly shaped as a cup and having a through hole in the rear portion of the housing is provided between the yoke of the motor and the switch; a bearing for supporting the armature shaft is provided in the housing; the brush holder of the motor is supported in such a manner that the holder is covered with the housing, and projects out of the nearly central portion of the housing; and a fixed contact, which is connected to a power supply through an external terminal, and a fixed contact, which is connected to the brush of said motor, are attached to the holder integrally therewith and project out of said through hole in such a manner that the contacts face the movable contact of the switch.

2 Claims, 6 Drawing Sheets

COAXIAL STARTER

BACKGROUND OF THE INVENTION

The present invention relates to an improved starter for an engine.

FIG. 6 shows a conventional starter which is for starting an engine and includes a speed reduction planet gear mechanism. The armature 100 of the DC motor of the starter comprises an armature core 101, an armature shaft 102, on the halfway portion of which the armature core is provided, and a commutator 103 fitted on the armature shaft 102 at the rear portion of the armature 100 and connected to an armature coil 104 provided on the armature core 101. A holder 105 for brushes located in contact with the commutator 103 is coupled to a rear cover 107 by bolts 106. A bearing 108 for supporting the armature shaft 102 at the rear end thereof is fitted in the recess of the rear cover 107. A plurality of permanent magnets 190*a* for applying a magnetic field to the armature 100 are secured on the inside circumferential surface of the yoke 109 of the DC motor. A front cover 111 fitted with the internal gear 110 of the speed reduction planet gear mechanism is thereof. A plurality of planet gears 113 are engaged with the internal gear 110 and the spur gear 112. Bearings 114 are fitted in the planet gears 113, and are supported by pins 115 secured to a flange 116 constituting the arm of the speed reduction mechanism. An output rotary shaft 117 is secured to the flange 116. A sleeve bearing 118 is fitted in the boss of the internal gear 110, and supports the output rotary shaft 117. A sleeve bearing 119 is fitted in the recess of the rear portion of the output rotary shaft 117, and supports the armature shaft 102 at the front end thereof. A steel ball 120 is provided between the ends of the armature shaft 102 and the output rotary shaft 117 to transmit a thrust. Helical splines 121 are formed on the outside circumferential surface of the halfway portion of the output rotary shaft 117, and are engaged with those of an overrunning clutch 122 so that the clutch is slidable backward and forward. A stopper 123 is provided on the output rotary shaft 116 at the front end thereof to restrict the quantity of the axial movement of a pinion 124 coupled to the overrunning clutch 122. A sleeve bearing 125 is fitted in the anterior part of the front cover 111, and supports the output rotary shaft 117 at the front end thereof. A lever 126 is provided with a pivot 126*a* at the plastic halfway portion of the lever, and is fitted to the actuator 128 of an electromagnetic switch 127 and the peripheral portion of the overrunning clutch 122 at the ends of the lever. A movable contact 129 is attached with an electric insulator 130 to a rod 131 fitted in a core 132 so that the rod is slidable backward and forward. A fixed contact 133 is secured by a nut 134 to a cap 135 made of an electric insulator. An electromagnetic coil 136 for moving the actuator 128 is provided on a plastic bobbin 137, and is housed in a case 138. A lead wire 139 connects the fixed contact 133 to one of the brushes. A spring 140 is housed in the actuator 128 to push the overrunning clutch 122 through the action of the lever 126. A spring 141 for returning the actuator 128 is provided further.

The operation of the conventional starter is described in detail hereinbelow. When an ignition switch not shown in FIG. 6 is turned on, the electromagnetic coil 136 of the electromagnetic switch 127 is energized to move the actuator 128 backward to push the rod 131 to put the movable contact 129 into touch with the fixed contact 133. As a result, the armature 100 is energized through the contacts 129 and 133, the lead wire 139, and the brushes so that the armature is rotated. The rotation of the armature 100 is transmitted to the overrunning clutch 122 through the spur gear 112 and the planet gears 113 so that the speed reduction planet gear mechanism makes the rotational speed of the clutch lower than that of the armature. At that time, the pinion 124 engaged with the clutch 122 is rotated. The actuator 128 being moved backward as mentioned above swings the lever 126 counterclockwise (as to FIG. 6) about the pivot 126*a* to slide the clutch 122 together with the pinion 124 forward in the axial direction thereof to engage the pinion with a ring gear formed on the peripheral portion of a flywheel mounted on the crankshaft of the engine not shown in FIG. 6 The engine thus is started. After that, the overrunning clutch 122 is disengaged from the pinion 124 because of the rotative action of the engine to the pinion, so that the pinion recesses.

Since the axis of the DC motor is parallel with that of the electromagnetic switch 127, it is necessary that the installation space for the switch is provided in a part of the engine or the vehicle. For that reason, the layout of the engine in the vehicle is restricted. This is a problem.

In order to solve the problem, a starter including an electric motor and an electromagnetic switch, which are disposed in series which each other, has been proposed. The basic constitution of the starter is that the armature shaft 202 of the DC motor 201 is hollow, and the actuator rod 204 of the electromagnetic switch 203 is laid in the internal opening 202*a* of the armature shaft 202 and extends toward an output rotary shaft 205, as shown in FIG. 5. Since the armature shaft 202 of the DC motor 201, the actuator rod 204 of the electromagnetic switch 203, and the output rotary shaft 205 extend along the same axis, the starter is called a coaxial starter. A pinion 206, which is engaged with the ring gear of an engine, is provided at the front end of the output rotary shaft 205 whose rear end is inserted in the internal opening 202*a* of the armature shaft 202. The output rotary shaft 205 is supported at the inserted portion 205*a* thereof by a sleeve bearing 207 secured in the internal opening 202*a* of the armature shaft 202, so that the output rotary shaft is slidable in the axial direction thereof. Driving power is transmitted from the armature shaft 202 of the DC motor 201 to the output rotary shaft 205 by a driving power transmission means 209 including an overrunning clutch 208 which is a one-way clutch. The means 209 also includes a speed reduction planet gear mechanism 210 including a sun gear 210*a* formed on the outside circumferential surface of the armature shaft 202 at the front end thereof, and planet gears 210*b*. The overrunning clutch 208 includes an outer member 208*a* to which support pins 211 for the planet gears 210*b* are secured, and an inner member 208*b* engaged with helical splines 205*c* formed on the outside circumferential surface of the expanded portion 205*b* of the output rotary shaft 205. However, since a fixed contact 212, a movable contact 213, which is brought into touch with the fixed contact 212 to apply electric power to the DC motor 201, and a cover 214 for the contacts are provided at the rear portion of the electromagnetic switch 203, the total length of the coaxial starter is so large that it interferes with a part of the engine. This is a problem. Since the fixed contact 212 needs to be connected to the brush of the DC motor 201 through a wire 215 outside the body of the starter, the efficiency of assembly of the starter is relatively low. This is another problem. Besides, the wire 215, a screw 216 for attaching the wire, and a screw 217 for attaching a power supply connection terminal are likely to interfere with the engine. This is yet another problem.

SUMMARY OF THE INVENTION

The present invention was made in order to solve the above-mentioned problems.

Accordingly, it is an object of the present invention to provide a coaxial starter in which a housing having a through hole in the rear portion of the housing is provided between the yoke of an electric motor and an electromagnetic switch; a bearing for supporting the armature shaft of the electric motor is provided in the housing; the brush holder of the motor is molded on fixed contacts, one of which is connected to a power supply through an external terminal and the other of which is connected to the brush of the motor; the brush holder projects out of the nearly central portion of the housing; and the fixed contacts project backward out of the through hole of the housing to face the movable contact of the electromagnetic switch. Since the brush holder molded on the fixed contacts is supported by the housing provided between the yoke of the electric motor and the electromagnetic switch, the mutual touching surfaces of the movable contact and the fixed contacts are located at the front portion of the electromagnetic switch so that the length of the coaxial starter is reduced. Since the brush holder is molded on the fixed contacts, the number of components assembled after the molding is decreased to facilitate the assembly of the electric motor and diminish the cost of production of the starter.

It is another object of the present invention to provide a coaxial starter in which a housing having a through hole in the rear portion of the housing is provided between the yoke of an electric motor and an electromagnetic switch; a bearing for supporting the armature shaft of the electric motor is provided in the housing; the brush holder of the motor is molded on fixed contacts, one of which is connected to a power supply through an external terminal and the other of which is connected to the brush of the motor; the brush holder projects out of the nearly central portion of the housing; the fixed contacts project out of the through hole of the housing and the notch of the core of the electromagnetic switch; the rear end of the brush holder extends in the same plane as those of the fixed contacts; and the core is supported around the fixed contacts Since each of the portions of the core and the fixed contacts, which overlap with each other in the axial direction of the electromagnetic switch, is increased in length along the axis of the switch, the length of the coaxial starter is reduced, and the accuracy of disposition of the core is enhanced.

DETAILED DESCRIPTION OF THE INVENTION

Embodiments of the present invention are hereafter described in detail with reference to the drawings attached hereto.

Figure 1:
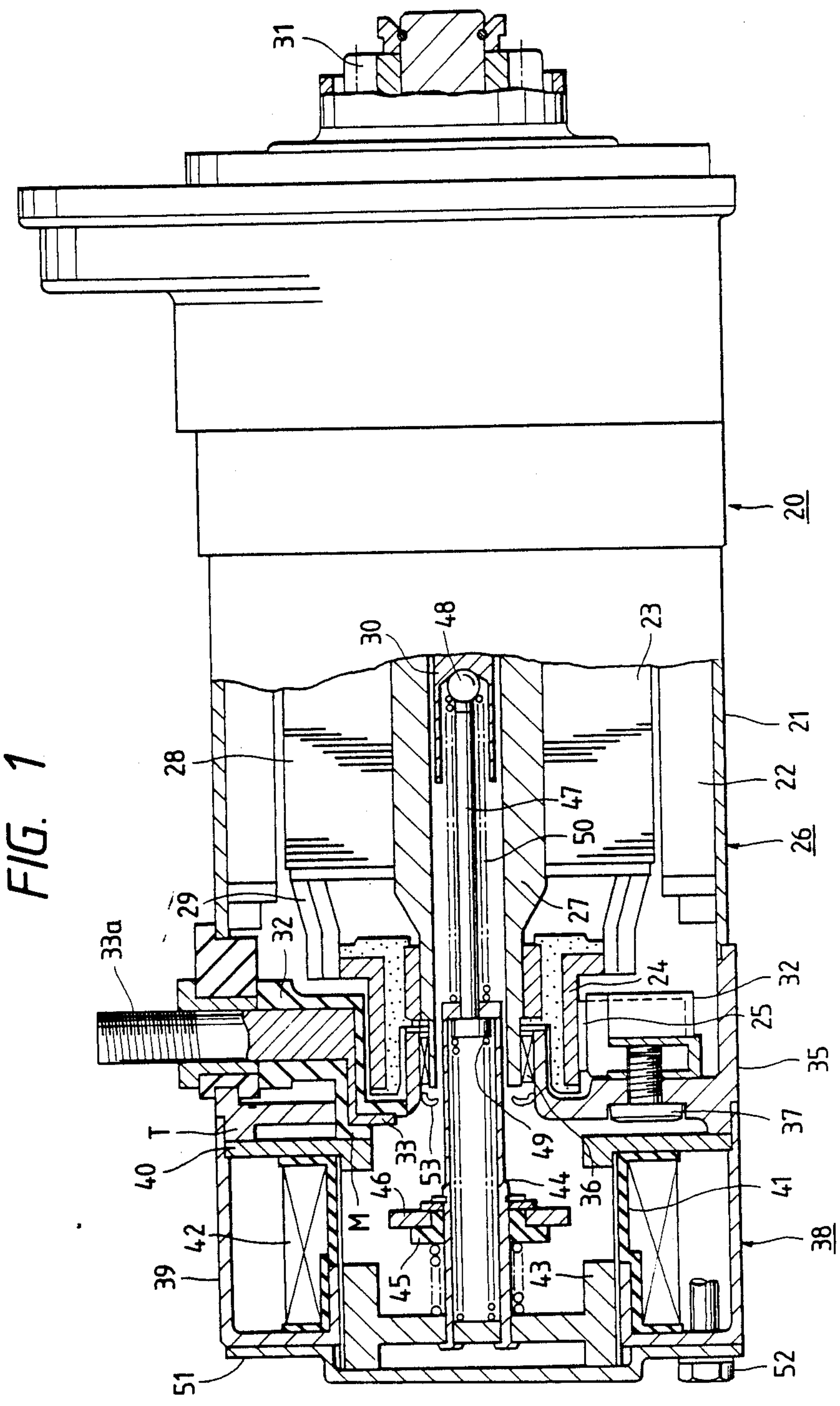
FIG. 1 shows a partially sectional view of a coaxial starter which is an embodiment of the present invention.
Figure 2:
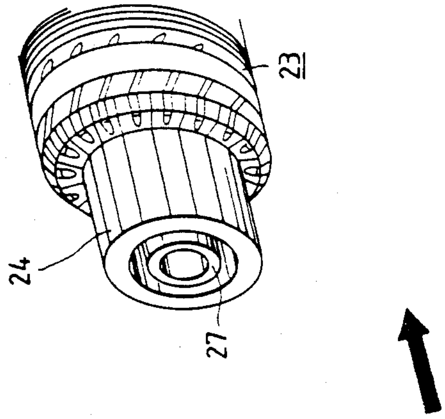
FIG. 2 shows a perspective exploded view of the brush and commutator section of the coaxial starter.
Figure 2:
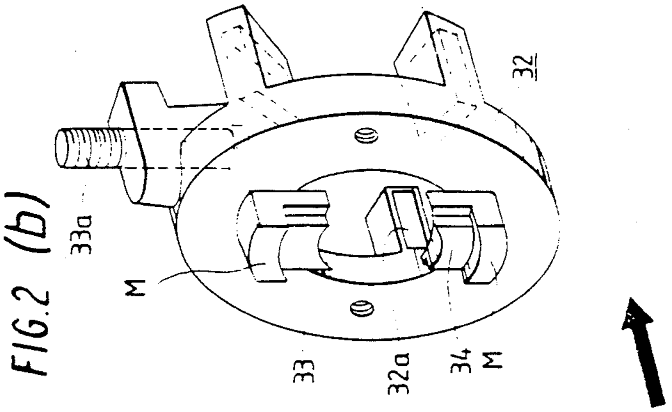
Figure 2:
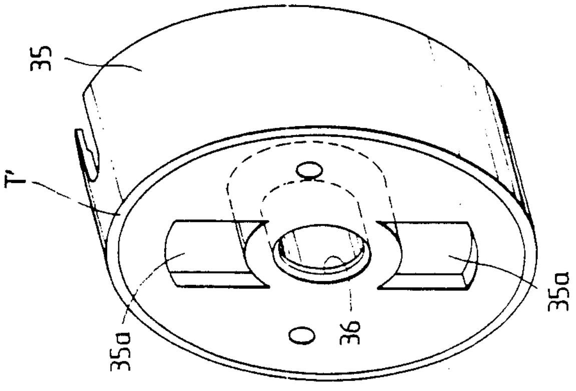
Figure 5:
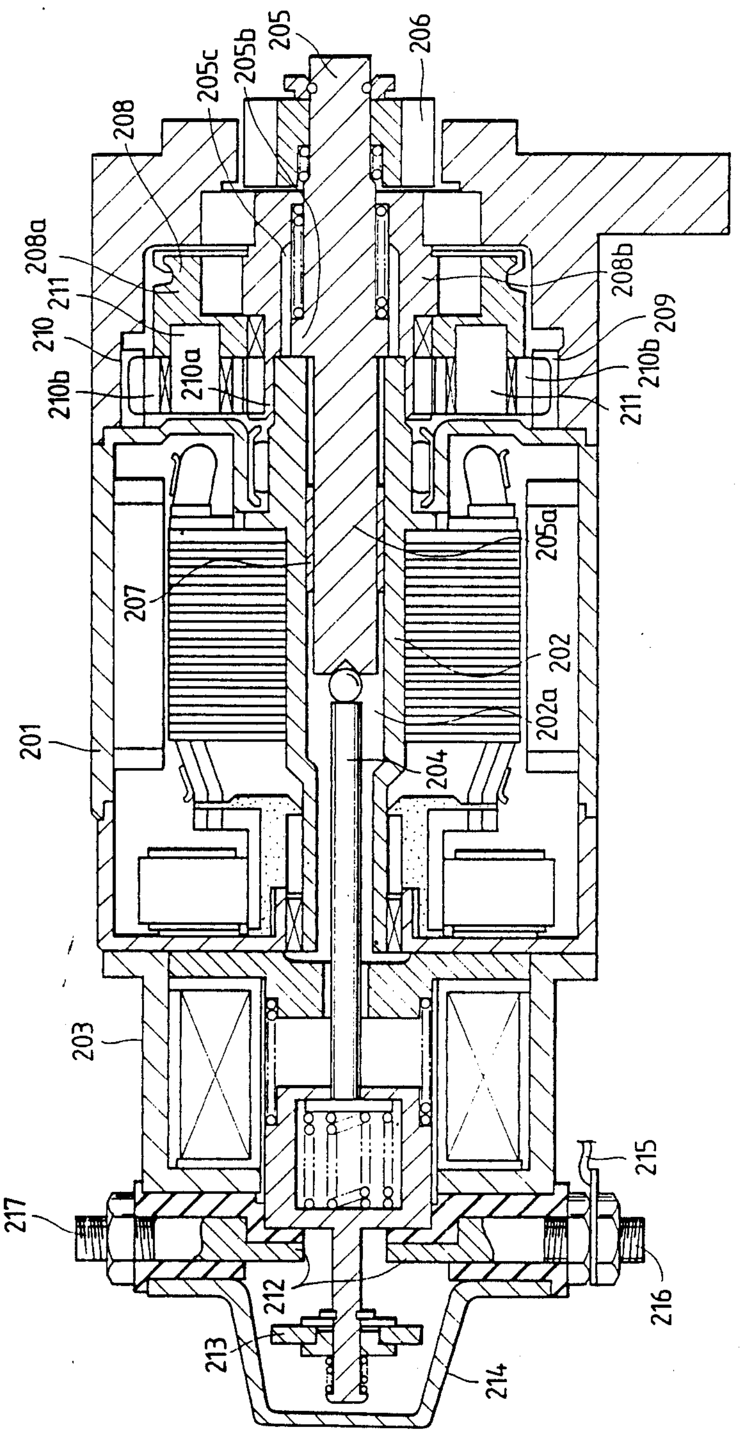
FIG. 5 PRIOR ART
FIG. 5 shows a sectional view of a conventional coaxial starter.
Figure 6:
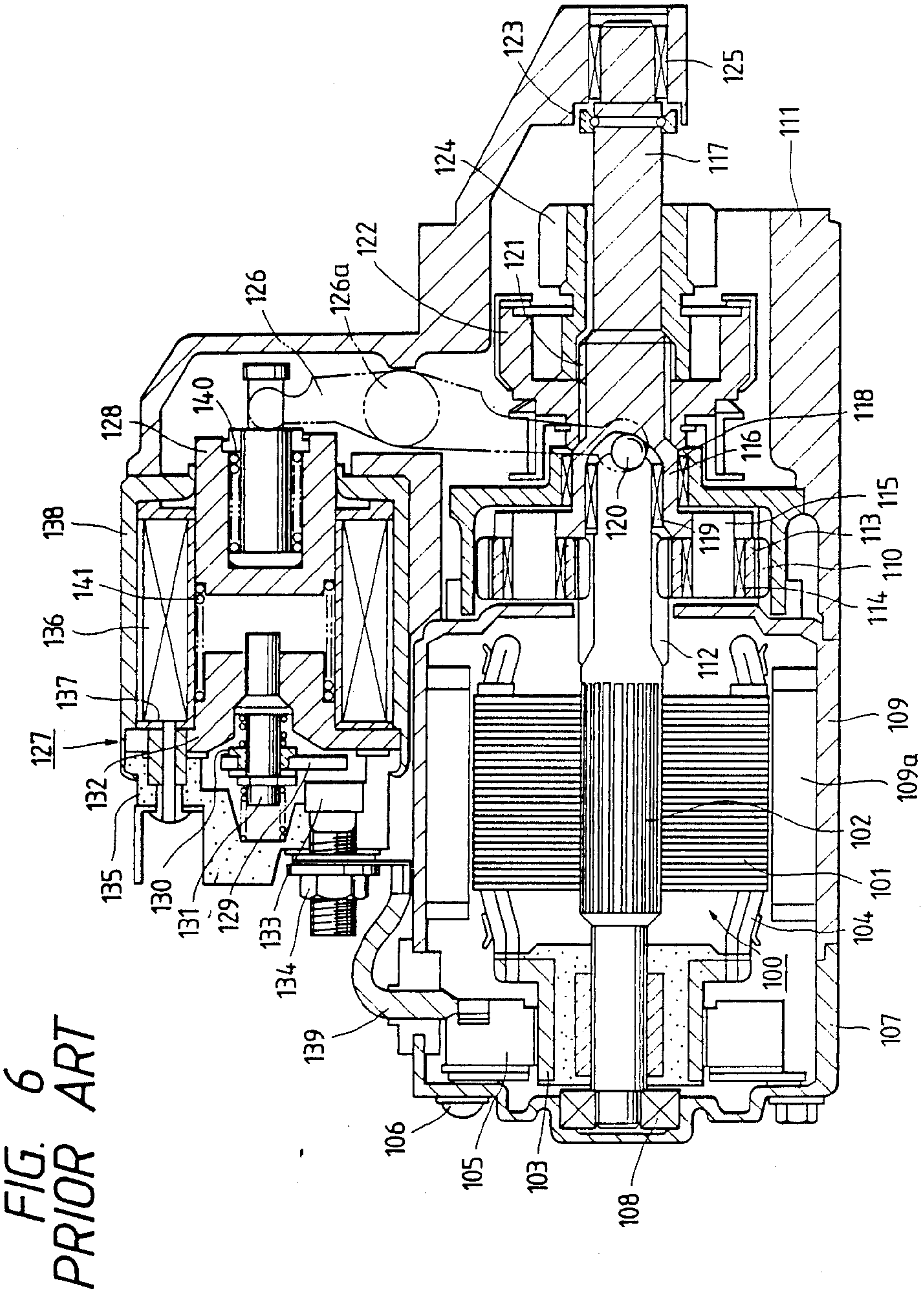
FIG. 6 PRIOR ART
FIG. 6 shows a sectional view of another conventional coaxial starter.

FIG. 1 shows a partially sectional view of a coaxial starter 20 which is one of the embodiments. FIG. 2 shows a perspective exploded view of the brush and commutator section of the DC motor 26 of the coaxial starter. The starter 20 includes the DC motor 26, a speed reduction planet gear mechanism not shown in the drawings, and an overrunning clutch not shown therein. The DC motor 26 includes permanent magnets 22 secured at circumferential intervals to the inside circumferential surface of a yoke 21 constituting a magnetism passage and a cover, an armature 23 rotatably supported inside the yoke, and a commutator 24 provided at the rear end of the armature and located in contact with brushes 25 along the circumference of the commutator. The armature 23 includes an armature shaft 27, which is hollow, an armature core 28 mounted on the outside circumferential surface of the shaft, and an armature coil 29 provided on the armature core and connected at the ends of the coil to the commutator 24. An output rotary shaft 30 is inserted backward in the armature shaft 27, and provided with a pinion 31 at the front end of the output rotary shaft so that the pinion can be engaged with the ring gear of an engine not shown in the drawings. The part of the coaxial starter, which is not shown in the sectional portion of the partially sectional view shown in FIG. 1, is equivalent in constitution and operation to the conventional coaxial starter shown in FIG. 5.

The brushes 25 are housed in a brush holder 32 made of plastic. A fixed contact 33, which is connected to a power supply through an external terminal screw **33*a* and a cable, and a fixed contact 34, which is connected to one of the brushes 25, are conjoined to the brush holder 32** integrally therewith by molding the holder from the plastic on the contacts.

A bearing 36, which supports the armature shaft 27 at the rear end thereof, is fitted in a housing 35 which constitutes a cover around the brush holder 32, and is fitted to the rear end of the yoke 21 at the front end of the housing, and located in contact with a core 40 at the projecting rear end T of the housing. The brush holder 32 and the housing 35 are clamped to each other by a screw 37.

The fixed contacts 33 and 34 project backward, out of the through hole **35*a* of the housing 35, as shown in FIG. 2. The armature 23 and the brush holder 32 are shown in FIGS. 2**(*a*) and 2(*b*), respectively. The brush holder 32 has casing portions **32*a* in which the brushes 25 and springs for pushing the brushes are housed. The fixed contact 34, which is connected to the brush 25 through a wire not shown in the drawings, is embedded in the brush holder 32 by molding the holder from the plastic. The fixed contact 33, which is connected to the power supply through the external terminal screw 33*a* and the cable, also is, embedded in the brush holder 32** by molding the holder from the plastic. The fixed contacts 33 and 34 project backward from the brush holder 32. The rear end M of the molded holder 32 and the projecting rear end T of the housing 35 extend in the same plane as that of the core 40. The housing 35 is shown in FIG. 2(*c*). The fixed contacts 33 and 34 project out of the through hole 35*a* of the housing 35 so that the rear ends of the contacts are located behind that of the housing and face the movable contact 46 of the electromagnetic switch 38 of the coaxial starter. At the time of assembly of the coaxial starter, the brush holder 32 is set around the commutator 24 of the armature 23, and the housing 35 then is fitted around the brush holder, as shown by arrows in FIG. 2, so that the contacts 33 and 34 project backward.

The electromagnetic switch 38 includes an electromagnetic coil 42 wound on a plastic bobbin 41 and supported by the core 40 constituting a magnetism passage together with the cover 39 of the switch, an actuator 43 slidably fitted in the central opening of the bobbin, a tubular rod 44 made of a nonmagnetic stainless steel, attached at one end of the rod to the actuator 43 and located at the other end thereof in the internal opening of the armature shaft 27, and the movable contact 46 held with an electric insulator 45 on the rod and facing the fixed contacts 33 and 34. A push rod 47 is fitted slidably in the tubular rod 44, and extends forward from the front portion thereof. The front end of the push rod 47 is located in contact with a steel ball 48 placed on the inside surface of a recess provided in the output rotary shaft 30 at the rear end thereof. A helical spring 49 is provided in the tubular rod 44 to apply a pushing force to the push rod 47. A helical spring 50 is provided around the push rod 47 to hold the steel ball 48 in a prescribed position. A nonmagnetic plate 51 is provided on the cover 39. These components are clamped together by a bolt 52 extending through them. A seal 53 is provided further.

The operation, of the coaxial starter 20 is described hereinbelow. When the ignition switch of a vehicle is turned on, the electromagnetic switch 38 is energized so that the actuator 43 is moved forward. As a result, the tubular rod 44 is moved to compress the helical spring 49 to apply the pushing force to the push rod 47 to slide the output rotary shaft 30 forward so that the pinion 31 is engaged with the ring gear of the engine. At the same time, the movable contact 46 attached to the tubular rod 44 moves to touch the fixed contacts 33 and 34 so that electric power is applied to the DC motor 26. Consequently, the armature shaft 27 of the motor 26 is rotated, and the rotatory power of the shaft is transmitted to the output rotary shaft 30 through the speed reduction planet gear mechanism and the overrunning clutch so that the engine is started through the rotative action of the pinion 31. After the engine thus is started, the electromagnetic switch 36 is deenergized so that the output rotary shaft 30 is returned to the original position by a return spring provided in an appropriate place, and the pinion is disengaged from the ring gear of the engine.

Although the rear end M of the brush holder 32 molded on the fixed contacts 33 and 34 and the projecting rear end T of the housing 35 are located in contact with the core 40 in the above-described embodiment, the present invention is not confined thereto but may be otherwise embodied so that the rear ends M and T are not provided, and a notch is provided in the portion of the core 40, which corresponds to the fixed contacts, 34, 34 and the whole front end of the core 40 is located in contact with the rear end of the housing 35. In the latter embodiment, the electromagnetic switch is located in a more anterior position than the former embodiment, so as to decrease the length of the coaxial starter.

Figure 3:
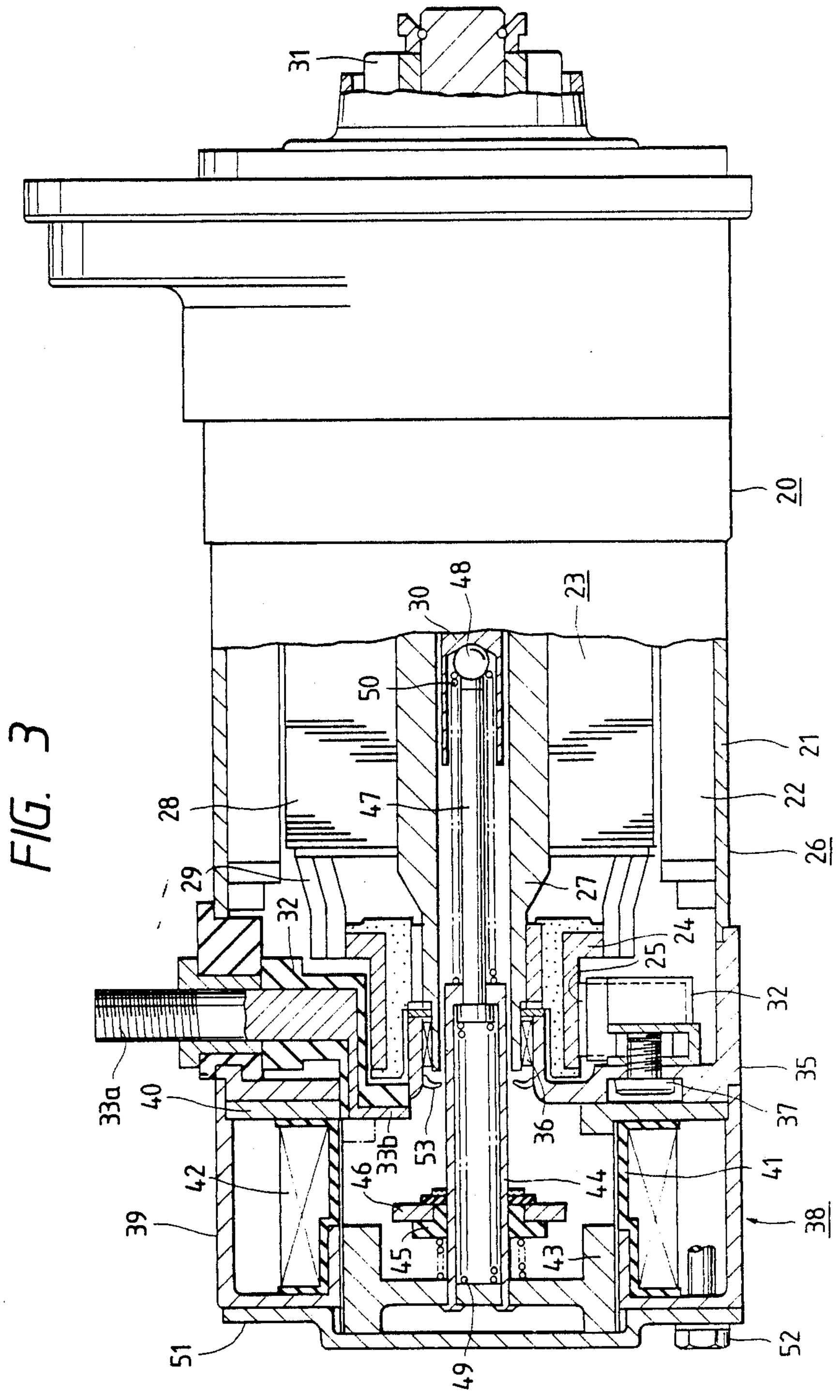
FIG. 3 shows a partially sectional view of a coaxial starter which is another embodiment of the present invention.
Figure 4:
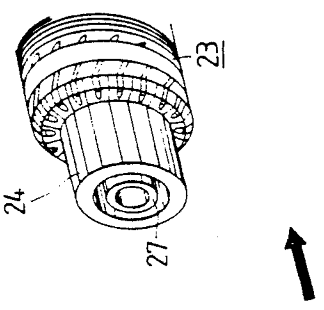
FiG. 4 shows a perspective exploded view of the brush and commutator section of the coaxial starter shown in FIG. 3.
Figure 4:
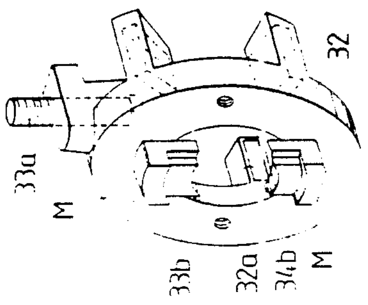
Figure 4:
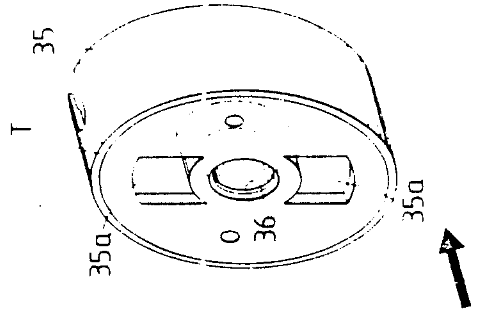
Figure 4:
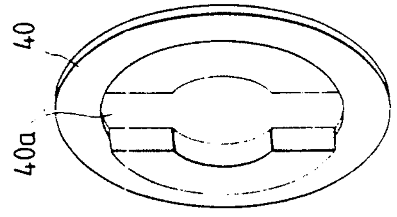

FIG. 3 shows a partially sectional view of a coaxial starter which is another one of the embodiments. FIG. 4 shows a perspective exploded view of the brush and commutator section of the coaxial starter. Only the difference between the coaxial starter shown in FIGS. 3 and 4 and that shown in FIGS. 1 and 2 is described hereinbelow. As shown in FIG. 3, a brush holder 32 is provided in the coaxial starter so that the rear end of a fixed contact 33*b* connected to a power supply extends in the same plane as that of the core 40 of an electromagnetic switch 38. The rear end of the fixed contact 33*b* and that of a fixed contact 34*b*, which is connected to one of the brushes of the DC motor of the starter, extend in the same plane as the rear end M of the molded holder 32, and the peripheral surfaces of the fixed contacts are shaped as an arc, as shown in FIG. 4(*b*). The core 40 has a notch 40*a* as shown in FIG. 4(d). The fixed contacts 33*b* and 34*b* project out of the through hole 35*a* of the housing of the starter and the notch 40*a*, and face the movable contact of the electromagnetic switch 38. The core 40 is supported around the fixed contact 33*b* and 34*b*. Since the rear ends of the fixed contacts 33*b* and 34*b* of the switch 38 extend in the same plane as the rear end M of the molded holder 32, and the fixed contacts project out to the notch 40*a* of the core 40 so that the contacts overlap with the core in the axial direction of the switch, the length of the coaxial starter is decreased. Since the core 40 is supported around the fixed contacts 33*b* and 34*b*, the accuracy of disposition of the core is enhanced and the assembly of the starter is facilitated.

Although the field magnet means of the DC motor of each of the coaxial starters shown in FIGS. 1, 2, 3, and 4 is made of permanent magnets, the present invention is not confined thereto but may be otherwise embodied so that the field magnet means is made of an electromagnet composed of a core and a coil wound thereon.

Although the speed reduction planet gear mechanism is provided in each of the above-described embodiments, the present invention is not confined thereto but may be otherwise embodied so that the speed reduction planet gear mechanism is not provided.

Although the fixed contacts are embedded in the brush holder integrally therewith in molding the holder, in each of the above-described embodiments, the present invention is not confined thereto, but may be otherwise embodied so that the fixed contacts are attached to the brush holder by bolts and nuts or the like.

What is claimed is:

1. A coaxial starter comprising:

an electric motor having an armature shaft which is hollow;

an output rotary shaft which is disposed at a front end of said motor and inserted in an internal opening of said armature shaft at one end of said output rotary shaft so as to be slidable in an axial direction of said output rotary shaft and has a pinion at another end thereof so that said pinion is engaged with or disengaged from a ring gear of an engine;

an electromagnetic switch disposed at a rear end of said motor so as to energize said motor and slide said output rotary shaft;

a housing nearly shaped as a cup and having a through hole in a rear portion of said housing provided between a yoke of said motor and said switch;

a bearing for supporting said armature shaft and provided in said housing;

a brush holder of said motor supported in such a manner that said holder is covered with said housing and projects out of a nearly central portion of said housing; and fixed contact members attached to said holder integrally therewith and projecting out of said through hole in such a manner that said fixed contact members face a movable contact of said switch, wherein a disk-shaped hollow core, which constitutes a magnetism passage of the electromagnetic switch, is provided in contact with the rear end of the housing; and said fixed contact members project out of the through hole of said housing and a notch of said core in such a manner that said core is supported around said fixed contact members.

2. A coaxial starter according to the claim 1, wherein said fixed contact members comprise a first fixed contact connected to a power supply through an external terminal and a second fixed contact connected to a brush of said motor.

* * * * *